US011718736B2

(12) United States Patent
Cartier et al.

(10) Patent No.: US 11,718,736 B2
(45) Date of Patent: Aug. 8, 2023

(54) BINDER FOR INJECTION MOULDING COMPOSITIONS

(71) Applicant: Comadur S.A., Le Locle (CH)

(72) Inventors: Damien Cartier, Besancon (FR); Jonathan Dumain, Besancon (FR)

(73) Assignee: Comadur S.A., Le Locle (CH)

( * ) Notice: Subject to any disclaimer, the term of this patent is extended or adjusted under 35 U.S.C. 154(b) by 1155 days.

(21) Appl. No.: 16/380,360

(22) Filed: Apr. 10, 2019

(65) Prior Publication Data

US 2019/0337858 A1 Nov. 7, 2019

(30) Foreign Application Priority Data

May 4, 2018 (EP) .................................. 18170805

(51) Int. Cl.
| | | |
|---|---|---|
| *C08L 23/08* | (2006.01) | |
| *B22F 1/103* | (2022.01) | |
| *B29C 45/00* | (2006.01) | |
| *C04B 35/10* | (2006.01) | |
| *C04B 35/48* | (2006.01) | |
| *C04B 35/634* | (2006.01) | |
| *C08K 5/20* | (2006.01) | |
| *C08L 23/16* | (2006.01) | |
| *C08L 91/06* | (2006.01) | |
| *B22F 1/10* | (2022.01) | |

(52) U.S. Cl.
CPC .............. *C08L 23/08* (2013.01); *B22F 1/103* (2022.01); *B29C 45/0001* (2013.01); *C04B 35/10* (2013.01); *C04B 35/48* (2013.01); *C04B 35/63404* (2013.01); *C04B 35/63408* (2013.01); *C04B 35/63424* (2013.01); *C08K 5/20* (2013.01); *C08L 23/16* (2013.01); *C08L 91/06* (2013.01); *B22F 1/10* (2022.01); *B29K 2905/02* (2013.01); *B29K 2905/08* (2013.01); *B29K 2909/02* (2013.01); *C08L 2205/035* (2013.01)

(58) Field of Classification Search
CPC ... C04B 35/63408; C04B 35/10; C04B 35/48; C04B 35/63404; C04B 35/63424; B29C 45/0001; C08K 5/20; C08L 23/16; C08L 91/06; C08L 2205/035; B29K 2905/02; B29K 2905/08; B29K 2909/02

USPC ......................................................... 524/229
See application file for complete search history.

(56) References Cited

U.S. PATENT DOCUMENTS

| | | | |
|---|---|---|---|
| 2005/0278849 A1 | 12/2005 | Polevoy et al. | |
| 2012/0235330 A1* | 9/2012 | ter Maat | ................ C04B 35/26 264/645 |
| 2014/0336034 A1* | 11/2014 | Cartier | .................... B01F 27/90 501/153 |
| 2016/0108216 A1 | 4/2016 | Cartier | |

FOREIGN PATENT DOCUMENTS

| | | |
|---|---|---|
| CH | 707 572 B1 | 8/2014 |
| CH | 708 097 A2 | 11/2014 |
| CH | 709 100 B1 | 7/2015 |
| CN | 104139180 A | 11/2014 |
| WO | 1 765 121 A2 | 3/2007 |
| WO | WO 2014/191304 A1 | 12/2014 |

OTHER PUBLICATIONS

Office Action dated Nov. 27, 2020 in corresponding Korean Patent Application No. 10-2019-0049294 (with English Translation), 6 pages.
European Search Report dated Oct. 10, 2018 in European Application 18170805.8 filed on May 4, 2018 (with English Translation of Categories of Cited Documents & Written Opinion).
Combined Chinese Office Action and Search Report dated Jul. 2, 2021 in Chinese Patent Application No. 201910347902.5 (with English translation), 17 pages.

* cited by examiner

*Primary Examiner* — Ling Siu Choi
*Assistant Examiner* — Ronald Grinsted
(74) *Attorney, Agent, or Firm* — Oblon, McClelland, Maier & Neustadt, L.L.P.

(57) ABSTRACT

A binder for an injection moulding composition including: from 40 to 55 volume percent of a polymeric base, from 35 to 45 volume percent of a mixture of waxes or a mixture of wax and palm oil, and at least 5 volume percent of at least one surfactant, wherein the polymeric base is formed of copolymers of ethylene and methacrylic or acrylic acid, copolymers of ethylene and propylene and/or maleic anhydride-grafted polypropylene, and polymers soluble in isopropyl alcohol, propyl alcohol and/or turpentine, and chosen from the group including a cellulose acetate butyrate, a polyvinyl butyral and a copolyamide, the respective quantities of the binder components being such that their sum is equal to 100 volume percent of the binder.

20 Claims, No Drawings

BINDER FOR INJECTION MOULDING COMPOSITIONS

CROSS-REFERENCE TO RELATED APPLICATION

This application claims priority to European Patent Application No. 18170805.8 filed on May 4, 2018, the entire disclosure of which is hereby incorporated herein by reference.

FIELD OF THE INVENTION

The invention concerns a binder composition for injection moulding and an injection moulding composition (feedstock) intended for the manufacture of shaped metal or ceramic parts.

BACKGROUND OF THE INVENTION

In the fabrication of hard materials for jewellery and the watch industry, or even for technical applications such as medical equipment, electronics, telephony, tools, machine cutting inserts, the consumer goods industry, and especially as regards hard materials generally designated under the generic name of inorganic 'ceramics', powder metallurgy techniques are implemented. The synthetic inorganic material obtained will be called 'ceramic' here, regardless of the nature of the material, be it sapphire, ruby, artificial diamond, sapphire glass, ceramic, micro-magnet, metal, alloy or other.

Generally speaking, the basic raw materials are different in nature and include at least, on the one hand, ceramic powder, and on the other hand, organic binders, such as resins or plastic materials or similar, which allow for injection and good resistance of the component made with the mixture of all the raw materials. Other additives may be included in the mixture. These raw materials may also be of different textures: solid, powder, liquid or paste. The structure of the mixture may also change during its creation, in particular but not exclusively, when complementary components of a resin undergo a polymerization reaction.

The overall fabrication process of an inorganic ceramic component includes at least the following steps:
preparing raw materials;
mixing raw materials, or/and pre-mixing two-by-two (or more) if required;
homogenization;
granulating;
pressing, notably in a pressing chamber, a quantity of powder or feedstock pellets obtained from the homogenization and granulating steps, to create a blank known as a 'green part'. This pressing operation can be performed by injection moulding, under pressure, notably in a screw injector including means for heating the quantity of powder or feedstock pellets obtained from the homogenization and granulating steps;
temperature-controlled debinding (thermal debinding) for combustion and/or dissolution of certain constituents of the mixture in a suitable solvent (solvent debinding);
heat treating the green part after debinding, for a secondary thermal debinding process and the sintering that gives the finished component its final coherency. This heat treatment causes dimensional shrinkage, which makes it possible to obtain a component with the final dimensions,
surface finishing treatment of the component.

It is a particular object of the invention to offer an optimised binder for injection moulding compositions that facilitates power metallurgy mixing to obtain ceramics or metals, in order to obtain a product of highly reproducible quality, with a controlled shrinkage coefficient.

There is already known, for example, Patent Application No. WO 2014/191304 by the Applicant, which discloses an injection moulding composition (feedstock) for fabrication of moulded ceramic or metal parts which contains a sintered inorganic powder and an organic binder, the latter being essentially formed of a mixture of copolymer of ethylene and methacrylic acid, polyethylene, polypropylene, acrylic resins and waxes.

These feedstocks have many advantages. More particularly, they offer good homogeneity and good fluidity allowing fabrication of metal or ceramic parts of more complex shapes. They also increase the mechanical resistance of green parts and binders to production stresses (handling and various finishing operations), and make it possible to perform solvent debinding, to eliminate part of the organic binder, using a non-polluting solvent that can be eliminated by a simple heat treatment.

SUMMARY OF THE INVENTION

It is an object of the present invention to overcome the aforecited drawbacks by proposing novel feedstocks for further improving the viscosity of the injected composition, to obtain more efficient solvent debinding and to obtain components of improved aesthetic quality.

The invention therefore concerns a binder for injection moulding compositions including:
from 40 to 55 volume percent of a polymeric base,
from 35 to 45 volume percent of a mixture of waxes or a mixture of wax and palm oil,
and at least 5 volume percent of at least one surfactant, wherein the polymeric base is formed of copolymers of ethylene and methacrylic or acrylic acid, copolymers of ethylene and propylene and/or maleic anhydride-grafted polypropylene, and polymers soluble in solvents chosen from the group including isopropyl alcohol, propyl alcohol, turpentine, and mixtures thereof, and chosen from the group including a cellulose acetate butyrate, a polyvinyl butyral and a copolyamide, the respective quantities of the binder components being such that their sum is equal to 100 volume percent of the binder.

The invention also concerns an injection moulding composition (feedstock) intended for fabrication of shaped metal or ceramic parts including 76 to 96 wt. % of an inorganic powder and 4 to 24 wt. % of the binder defined above.

The injection moulding composition according to the invention makes it possible to improve the viscosity of the injected composition, to obtain more efficient solvent debinding and to obtain components of improved aesthetic quality.

DETAILED DESCRIPTION OF PREFERRED EMBODIMENTS

According to the invention, the binder for injection moulding compositions includes the following components:
from 40 to 55 volume percent, preferably 45 to 54 volume percent of a polymeric base,
from 35 to 45 volume percent, preferably 39 to 42 volume percent of a mixture of waxes or a mixture of wax and palm oil, and at least 5 volume percent, preferably 5 to 15 volume percent of at least one surfactant, wherein the polymeric base is formed of copolymers of ethylene and methacrylic or acrylic acid, copolymers of ethylene and propylene and/or maleic anhydride-grafted polypropylene, and polymers soluble in isopropyl alcohol and/or propyl alcohol and/or turpentine, and chosen from the group including a cellulose acetate butyrate, a polyvinyl butyral and a copolyamide, the respective quantities of the binder components being such that their sum is equal to 100 volume percent of the binder.

Preferably, the polymeric base of the binder of the invention includes from 2 to 7 volume percent of copolymers of ethylene and methacrylic or acrylic acid, from 0 to 40 volume percent of copolymers of ethylene and propylene, from 0 to 35 volume percent of maleic anhydride-grafted polypropylene, the overall quantity of copolymer of ethylene and propylene and maleic anhydride-grafted polypropylene being comprised between 30 and 40 volume percent, and from 6 to 15 volume percent of polymer soluble in isopropyl alcohol and/or propyl alcohol and or turpentine, to 100 volume percent of binder, the respective quantities of the binder components being such that their sum is equal to 100 volume percent of binder.

Preferably, the polymeric base includes a mixture of copolymers of ethylene and propylene and maleic anhydride-grafted polypropylene.

Preferably, the polymeric base of the binder of the invention includes from 2 to 7 volume percent of copolymers of ethylene and methacrylic or acrylic acid, from 25 to 30 volume percent of copolymers of ethylene and propylene, from 5 to 10 volume percent of maleic anhydride-grafted polypropylene and from 6 to 15 volume percent of polymer soluble in isopropyl alcohol and/or propyl alcohol and/or turpentine, to 100 volume percent of binder.

More preferably, the polymeric base of the binder of the invention includes from 3 to 5 volume percent of copolymers of ethylene and methacrylic or acrylic acid, from 26 to 29 volume percent of copolymers of ethylene and propylene, from 6 to 8 volume percent of maleic anhydride-grafted polypropylene and from 6 to 12 volume percent of polymer soluble in isopropyl alcohol and/or propyl alcohol and/or turpentine, to 100 volume percent of binder.

Preferably the ethylene-propylene copolymer is a (random) statistical copolymer of ethylene and propylene with a melting point comprised between 140° C. and 150° C., this melting point varying according to the percentage of ethylene and propylene in said copolymer. For example, for oxide and nitride powders, the statistical copolymer of ethylene and propylene preferably contains more propylene to have a melting point of around 147° C. For metal powders, the statistical copolymer of ethylene and propylene preferably contains more ethylene to have a melting point of around 140° C.

Preferably, the copolymer of ethylene and methacrylic or acrylic acid contains from 3 to 10 wt % of methacrylic or acrylic comonomer.

Preferably, the maleic anhydride-grafted polypropylene has a grafting rate of between 1% and 2% and a melting point of between 100° C. and 140° C.

Preferably, the polymer soluble in isopropyl alcohol and/or propyl alcohol and/or turpentine is a cellulose acetate butyrate having a butyryl content of between 37 wt. % and 53 wt. %, an acetyl content of between 2 wt. % and 13 wt. % to the weight of polymer, a melting point of between 125° C. and 165° C. and a molecular weight of between 16000 and 40000.

Advantageously, the wax is a Carnauba wax or a paraffin wax or a mixture of these elements. When the wax is a mixture with palm oil, the wax is preferably Carnauba wax.

According to another preferred feature, the surfactant is an N,N'-ethylene bisstearamide or a mixture of stearic and palmitic acids (stearin), or a mixture of these elements.

According to another feature, the surfactant is soluble in isopropyl alcohol and/or propyl alcohol and/or turpentine.

The invention also concerns an injection moulding composition (feedstock) intended for fabrication of shaped metal or ceramic parts including 76 to 96 wt. % of an inorganic powder and 4 to 24 wt. % of the binder defined above.

According to a particular feature, the inorganic powder of the injection moulding composition can be chosen from the group including an oxide powder, nitride powder, carbide powder, metal powder, or a mixture of said powders and preferably the inorganic powder is chosen from the group including an alumina powder, a zirconium oxide powder, a chromium carbide powder, a titanium carbide powder or a tungsten carbide powder, a metallic tungsten powder or silicon nitride powder, a stainless steel powder, a metallic titanium powder or a mixture of said powders.

According to preferred embodiments of the injection moulding composition, the latter contains in weight percent:
- 76 to 88% of alumina and 12 to 24% of binder according to the invention as defined above, or
- 76 to 88% of alumina and 0.1 to 0.6% of magnesium oxide and 12 to 24% of the binder of the invention, or
- 58 to 86.5% of zirconium oxide and 3.9 to 4.6% of yttrium oxide and 0.18 to 18.5% of alumina and 9 to 22% of the binder of the invention, or
- 61.5 to 84% of zirconium oxide and 3.9 to 4.6% of yttrium oxide and 0.2 to 9% of alumina and 2 to 5.5% of inorganic pigments from a list including iron oxide, cobalt oxide, chromium oxide, titanium oxide, manganese oxide, zinc oxide or a mixture of said oxides and 9 to 22% of the binder of the invention, or
- 88 to 91% of chromium or titanium carbide, and 9 to 12% of the binder of the invention, or
- 93 to 96% of tungsten carbide or metallic tungsten and 4 to 7% of the binder of the invention, or
- 78 to 85% of silicon nitride and 15 to 22% of the binder of the invention.

The injection moulding composition (feedstock) intended for fabrication of shaped metal or ceramic parts according to the invention has lower viscosity than known feedstocks, for equivalent shear rates. Consequently, the composition of the invention makes it possible to better fill the parts during injection moulding, especially in areas with thin walls. Further, the composition according to the invention makes possible more efficient solvent debinding of parts, particularly through improved elimination of the binder components in the isopropyl alcohol and/or propyl alcohol and/or turpentine solvent. Propyl alcohol, with a boiling point of 97° C. makes it possible to debind at a higher temperature for improved efficiency, especially through improved elimination of Carnauba wax (melting point of 82° C.).

The composition of the invention also makes it possible to obtain moulded and sintered parts having an improved surface appearance, without visible cracks or lines of weld.

This invention will now be illustrated in more detail by means of the following non-limiting examples.

EXAMPLES

The polymeric part of the binder is mixed with an inorganic powder at a temperature of around 150° C. to create a premix. To said premix are added the waxes and surfactant, and the temperature is further increased to around 180° C. to form a kind of homogeneous paste, which is then cooled and granulated to solidification, and then kept to form feedstock that can be used for fabrication of a shaped part by a known injection moulding technique.

This technique typically includes a high pressure, hot injection moulding operation in a mould with cavities. The part is cooled inside the cavity and then ejected from the mould. All the processes are carried out at around 170°-180° C. The green part is then subjected to debinding in isopropyl alcohol before being sintered. Debinding eliminates part of the organic binder from the part and leaves just enough binder to maintain cohesion, or, in other words, the moulded shape of the green part. The binder is typically removed from the green part by heating the solvent in which the part is immersed. During this operation, at least 40% of the binder compounds must be dissolved. With the binder of the invention, the green part is typically immersed in the isopropyl alcohol solvent and heated to a temperature of around 70° C. At this temperature, the wax mixture or wax and oil mixture thermally decomposes while the surfactants and the isopropyl alcohol soluble polymers are chemically dissolved. Once the solvent debinding operation is complete, the part is porous. The part is then placed in a high temperature furnace in order, firstly, to eliminate the remaining binder (thermal debinding, typically at a temperature of less than 400° C.), this operation being facilitated by the porosity left in the part during solvent debinding, and then, secondly, to sinter the part at a high temperature.

Parts are made according to the method described above from various binders of the invention with the compositions indicated in Table I below, as a function of the nature of the inorganic powder:

No. WO 2014/191304 with the same Saint-Gobain Zir Black black inorganic zirconium oxide $ZrO_2$ powder was measured.

The results are set out in Table II below:

TABLE II

| Shear rate (1/s) | Viscosity example Saint-Gobain Zir Black black $ZrO_2$ powder according to Example I of WO2014/191304 (Pa · s) at 172° C. ØM Powder: 86.05% | Viscosity example Saint-Gobain Zir Black black $ZrO_2$ powder according to Example I of the invention (Pa · s) at 172° C. ØM Powder: 86.05% |
|---|---|---|
| 10 | 8000 | 4300 |
| 100 | 1300 | 500 |
| 1000 | 120 | 75 |

The injection moulding composition according to the invention has lower viscosity than known feedstocks, for equivalent shear rates.

Further, elimination of the binder during debinding in the isopropyl alcohol solvent is improved: around 45% of the binder described in Patent Application WO2014/191304 was eliminated in the solvent whereas at least 50% of binder of the invention is eliminated, notably the cellulose acetate butyrate. In the case of metal powders, the percentage of elimination can be up to 65%.

The moulded and sintered parts obtained have an improved surface appearance, without visible cracks or lines of weld.

The invention claimed is:

1. A binder suitable for an injection molding composition, the binder comprising, based on total binder volume:

TABLE I

| Components | Example 1 (volume %/100% of binder) Oxides (zironia, alumina etc.) | Example 2 (volume %/100% of binder) Nitrides ($Si_3N_4$, TiN, etc.) | Example 3 (volume %/100% of binder) Carbides, cermets and metals (TiC, WC, W, steel, etc.) |
|---|---|---|---|
| Ethylene-propylene copolymer (random polypropylene copolymer) | 28.5 | 28 | 27 |
| Copolymers of ethylene and methacrylic acid | 4.5 | 4.5 | 4.5 |
| Polypropylene grafted maleic anhydride | 7 | 7 | 7 |
| Cellulose acetate butyrate | 10.5 | 6.5 | 10.5 |
| Carnauba wax | 10.5 | 10 | 10 |
| Paraffin wax | 31 | 30 | 29 |
| N,N'-ethylene bis(stearamide) | 8 | 10 | 14 |
| Stearin |  | 4 |  |
| Mass percentage of powder | $ZrO_2$: 86% | $Si_3N_4$: 78% | TiC: 89% |

The components are commercially available. The ethylene-propylene copolymer (random polypropylene copolymer) is PPR 10232 distributed by Total Refining & Chemicals. The maleic anhydride-grafted polypropylene is Fusabond® P353 distributed by DuPont™. The cellulose acetate butyrate is CAB-551-0.01 distributed by Eastman™.

A composition was made according to Example 1 above with Saint-Gobain Zir Black black zirconium oxide $ZrO_2$ powder as the organic powder. The viscosity of this composition was measured with an Instron Ceast SR20 capillary rheometer with a 1 mm diameter and 20 mm length die.

By way of comparison, the viscosity of the feedstock composition disclosed in Example 1 of Patent Application a polymeric base, in a range of from 40 to 55 vol. %;
a mixture of waxes, or a mixture of wax and palm oil, in a range of from 35 to 45 vol. %; and
a surfactant, in at least 5 vol. %,
wherein the polymeric base of comprises (i) a copolymer ethylene and methacrylic or acrylic acid, (ii) a copolymer of ethylene and propylene and/or maleic anhydride-grafted polypropylene, and (iii) a solvent-soluble polymer, soluble in isopropyl alcohol, propyl alcohol, turpentine, or a mixture thereof, and
wherein the solvent-soluble polymer (iii) is a cellulose acetate butyrate, a polyvinyl butyral, and/or a copolyamide, and wherein the binder has a lower viscosity, measured with a capillary rheometer with a 1 mm diameter and 20 mm length die, at 172° C. and shear rates of 10, 100, and 1000 Hz, than a binder lacking the solvent-soluble polymer (iii).

2. The binder of claim 1, wherein the polymeric base comprises
the copolymer (i) of ethylene and methacrylic or acrylic acid in a range of from 2 to 7 vol. %,
the copolymer (ii-a) of ethylene and propylene in a range of from 0 to 40 vol. %,
the copolymer (ii-b) of maleic anhydride-grafted polypropylene in a range of from 0 to 35 vol. %, and
the solvent-soluble polymer (iii) in a range of from 6 to 15 vol. %,
wherein the copolymer of ethylene and propylene and the maleic anhydride-grafted polypropylene are present in a range of from 30 to vol. %, and
wherein a total of the copolymer (i), copolymer (ii-a), copolymer (ii-b), and solvent-soluble polymer (iii) make up 100 vol. % of binder.

3. The binder of claim 1, wherein the polymeric base comprises a plurality of the copolymer (ii) of ethylene and propylene and maleic anhydride-grafted polypropylene as a mixture of copolymers (ii).

4. The binder of claim 3, wherein the polymeric base comprises
the copolymer (i) of ethylene and methacrylic or acrylic acid in a range of from 2 to 7 vol. %,
the copolymer (ii-a) of ethylene and propylene in a range of from 25 to 30 vol. %,
the copolymer (ii-b) of maleic anhydride-grafted polypropylene in a range of from 5 to 10 vol. %, and
the solvent-soluble polymer (iii) in a range of from 6 to 15 vol. %,
wherein a total of the copolymer (i), copolymer (ii-a), copolymer (ii-b), and solvent-soluble polymer (iii) make up 100 vol. % of binder.

5. The binder of claim 1, wherein the copolymer (ii) comprises a copolymer (ii-a) of ethylene and propylene, which is a random statistical copolymer of ethylene and propylene with a melting point in a range of from 140 to 150° C.

6. The binder of claim 1, wherein the copolymer (i) comprises methacrylic or acrylic comonomer from 3 to 10 wt. % of methacrylic or acrylic comonomer.

7. The binder according to claim 1, wherein the copolymer (ii) comprises a copolymer (ii-b) of maleic anhydride-grafted polypropylene having a grafting rate in a range of from 1 to 2% and a melting point in a range of from 100 to 140° C.

8. The binder of claim 1, wherein the solvent-soluble polymer (iii) is a cellulose acetate butyrate having, relative to total solvent-soluble polymer (iii) weight,
a butyryl content in a range of from 37 to 53 wt. %, and an acetyl content in a range of from 2 to 13 wt. %,
wherein the solvent-soluble polymer (iii) has a melting point in a range of from 125 to 165° C. and
wherein the solvent-soluble polymer (iii) has a molecular weight in a range of from 16000 to 40000.

9. The binder of claim 1, wherein the wax is a Carnauba wax, a paraffin wax, or a mixture thereof.

10. The binder of claim 1, wherein the wax and palm oil mixture is present, and
wherein the wax is a Carnauba wax.

11. The binder of claim 1, wherein the surfactant is an N,N'-ethylene bis(stearamide).

12. The binder of claim 1, wherein the surfactant is soluble in isopropyl alcohol, propyl alcohol, turpentine, or a mixture thereof.

13. An injection molding composition feedstock suitable for abricating one or more shaped metal or ceramic parts, the injection molding composition comprising:
an inorganic powder in a range of from 76 to 96 wt. %, and
the binder of claim 1 in a range of from 4 to 24 wt. %.

14. The molding composition of claim 13, wherein the inorganic powder comprises an oxide powder, nitride powder, carbide powder, and/or metal powder.

15. The molding composition of claim 14, wherein the inorganic powder comprises an alumina powder, a zirconium oxide powder, a chromium carbide powder, a titanium carbide powder, a tungsten carbide powder, a metallic tungsten powder, a silicon nitride powder, a stainless steel powder, a metallic titanium powder, or a mixture thereof.

16. The molding composition of claim 13, comprising, in weight percentage:
alumina in a range of from 76 to 88% and the binder in a range of from 12 to 24%; or
alumina in a range of from 76 to 88%, magnesium oxide in a range of from 0.1 to 0.6%, and the binder in a range of from 12 to 24%,
zirconium oxide in a range of from 58 to 86.5%, yttrium oxide in a range of from 3.9 to 4.6%, alumina in a range of from 0.18 to 18.5%, and the binder in a range of from 9 to 22%; or
zirconium oxide in a range of from 61.5 to 84%, yttrium oxide in a range of from 3.9 to 4.6%, alumina in a range of from 0.2 to 9%, organic pigment in a range of from 2 to 5.5% of inorganic pigments from a list including iron oxide, cobalt oxide, chromium oxide, titanium oxide, manganese oxide, zinc oxide or a mixture of said oxides and in a range of from 9 to 22% of binder, the inorganic pigment comprising iron oxide, cobalt oxide, chromium oxide, titanium oxide, manganese oxide, and/or zinc oxide; or
chromium or titanium carbide in a range of from 88 to 91%, and the binder in a range of from 9 to 12%; or
tungsten carbide or metallic tungsten in a range of from 93 to 96%, and the binder in a range of from 4 to 7%; or
silicon nitride in a range of from 78 to 85%, and the binder in a range of from 15 to 22%.

17. The binder of claim 1, wherein the surfactant is a mixture of stearic and palmitic acids.

18. The binder of claim 1, wherein the surfactant comprises an N,N'-ethylene bis(stearamide), stearic acid, and palmitic acid.

19. The binder of claim 1, having a viscosity, measured with a capillary rheometer with a 1 mm diameter and 20 mm length die, at 172° C. and a shear rate of 10 Hz of no more than 4300 Pa•s.

20. The binder of claim 1, having a viscosity, measured with a capillary rheometer with a 1 mm diameter and 20 mm length die, at 172° C. and a shear rate of 100 Hz of no more than 500 Pa•s.

* * * * *